United States Patent [19]
Reh et al.

[11] Patent Number: 5,335,076
[45] Date of Patent: Aug. 2, 1994

[54] SOFT SHROUD FOR SCREEN DISPLAY DEVICE

[75] Inventors: Carter K. Reh, Santa Ana; Edward Robak, Orange, both of Calif.

[73] Assignee: General Production Services, Inc., Anaheim, Calif.

[21] Appl. No.: 962,277

[22] Filed: Oct. 16, 1992

[51] Int. Cl.$^5$ ............ H04N 5/645; H04N 5/64; A47B 5/00; H01H 1/10
[52] U.S. Cl. ............ 348/794; 312/7.2; 200/5 A; 200/513; 348/823; 348/837
[58] Field of Search ............ 358/247, 248, 254, 255, 358/246; 312/7.2; 200/5 A, 275, 513

[56] References Cited

U.S. PATENT DOCUMENTS

| | | | |
|---|---|---|---|
| 4,491,702 | 1/1985 | Kato | 200/5 |
| 4,647,980 | 3/1987 | Steventon | 358/254 |
| 4,987,275 | 1/1991 | Miller | 200/5 |

*Primary Examiner*—Edward L. Coles, Sr.
*Assistant Examiner*—Allan A. Esposo
*Attorney, Agent, or Firm*—Plante Strauss and Vanderburgh

[57] ABSTRACT

There is disclosed a housing for a thin, flat display screen such as a liquid crystal display. The housing is formed of components comprising a front housing section having a front panel with an opening for exposing the screen of a flat screen device placed within the housing and a rear cover therefor which includes a hinged attachment to the front housing section which is recessed and inaccessible from the exterior of the closed housing. The assembly of front housing section and rear cover is secured with tangs carried on the lower rear edges of these components. The housing is adapted to be mounted in the chair arm of a passenger seat of commercial airliners, and includes a mounting bracket permitting it to be stowed within the chair arm when not in use. In this application it is essential that the housing have an outer covering of impact absorbing material to protect passengers from injury upon impact against the housing. It is also important that the housing be tamper and intrusion proof. To this end, the housing components are formed with interior metal liners which are surfaced with plastic foam coatings that completely encase the assembled housing. A control panel with membrane control buttons is integrally formed with the outer foam covering.

20 Claims, 4 Drawing Sheets

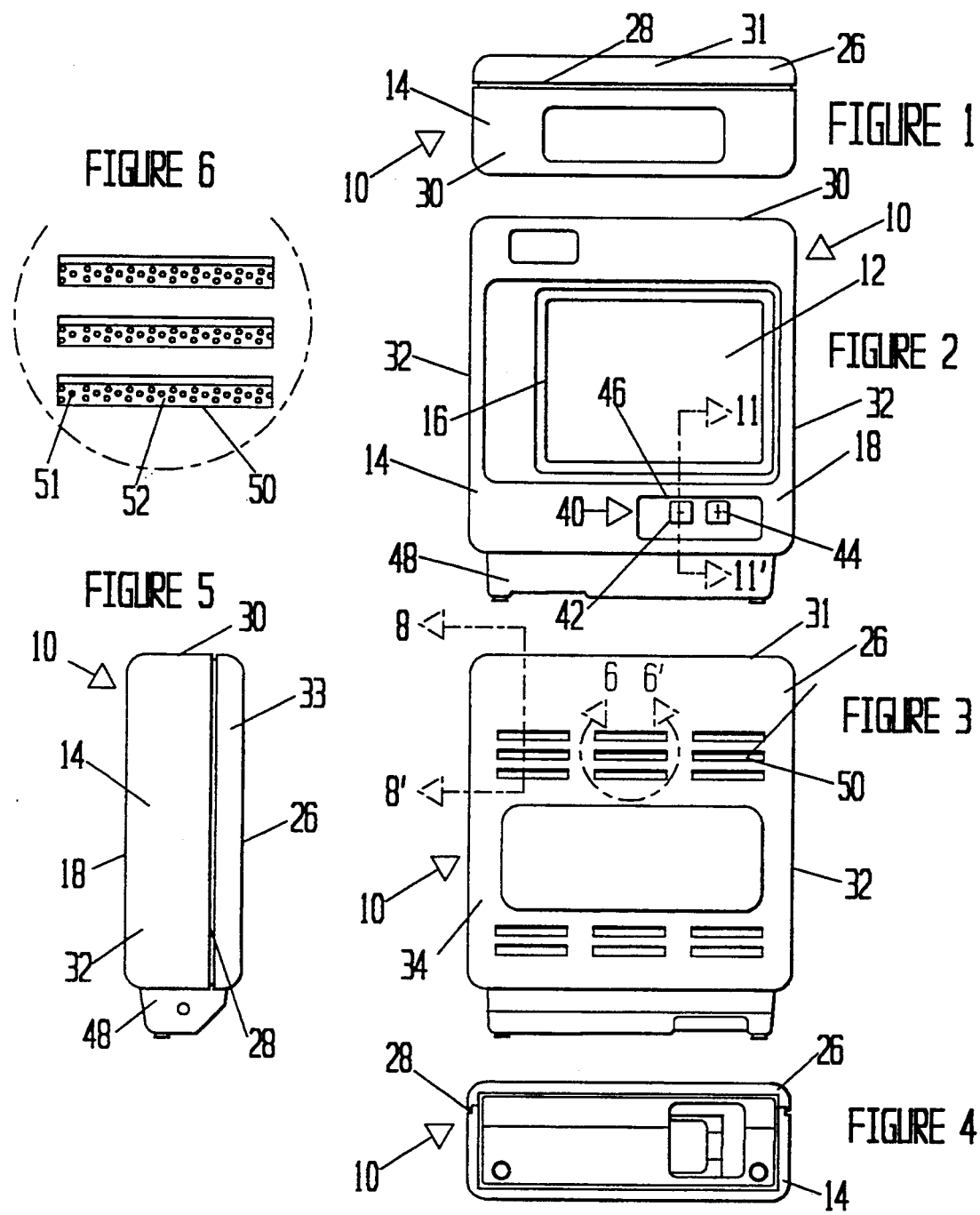

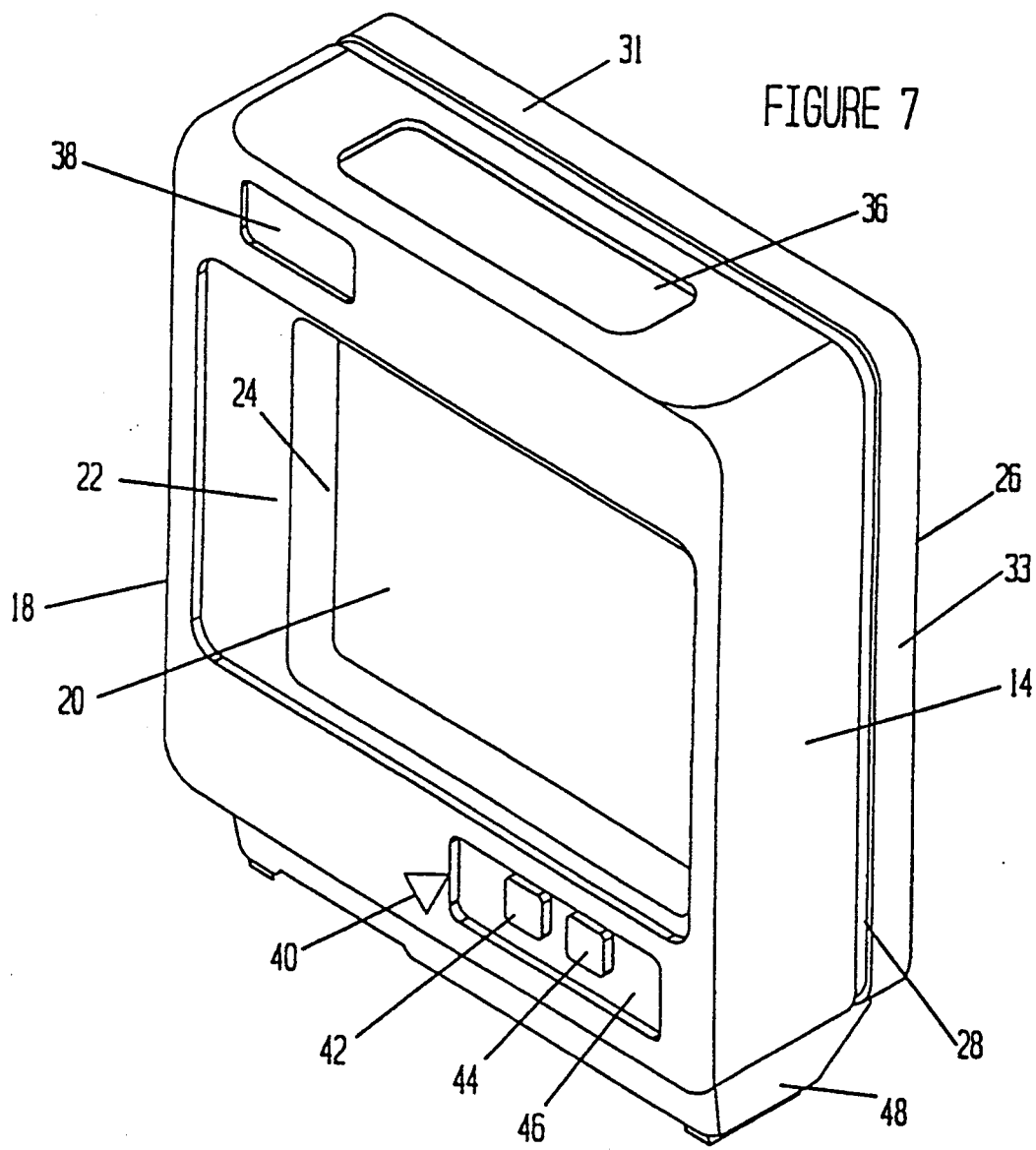

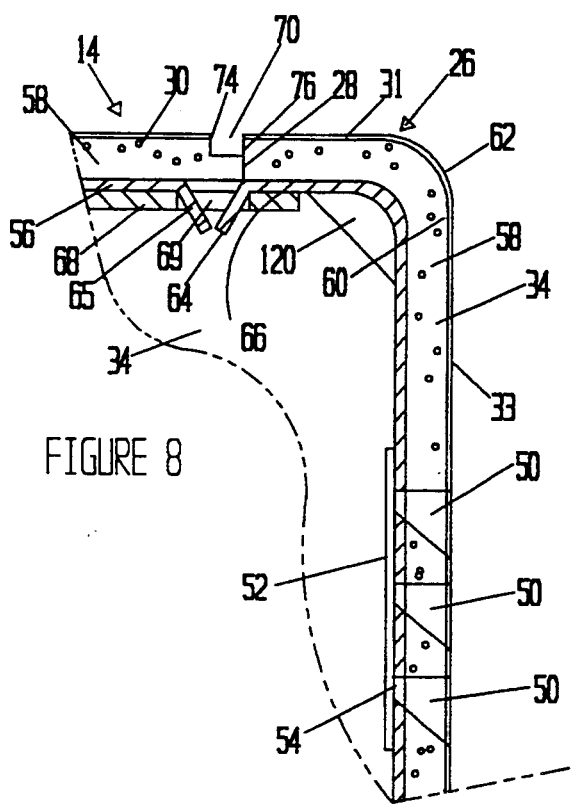
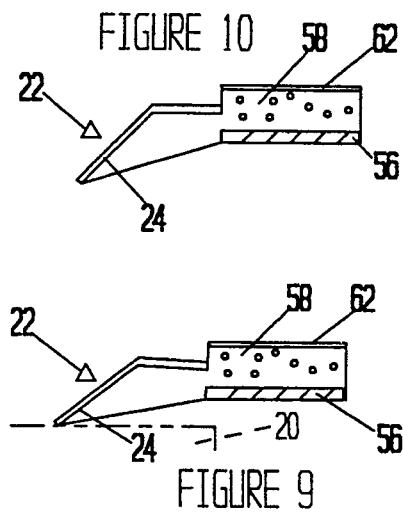
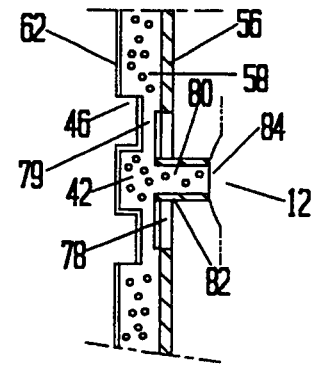
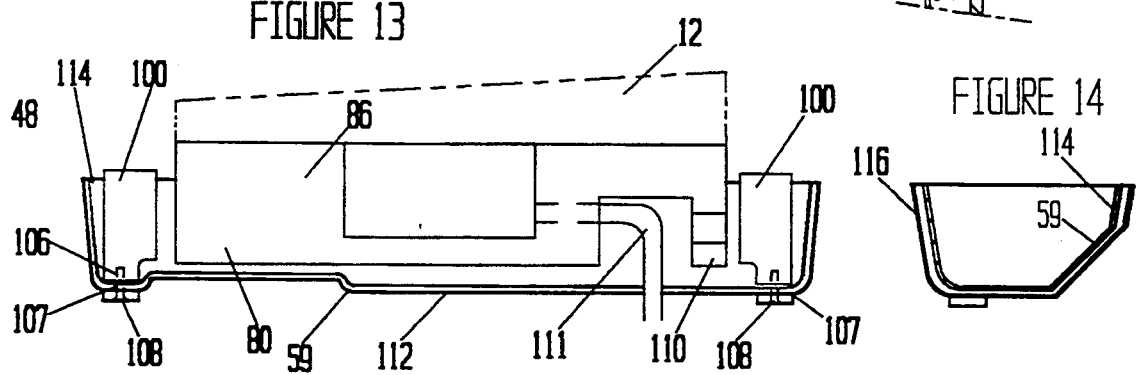

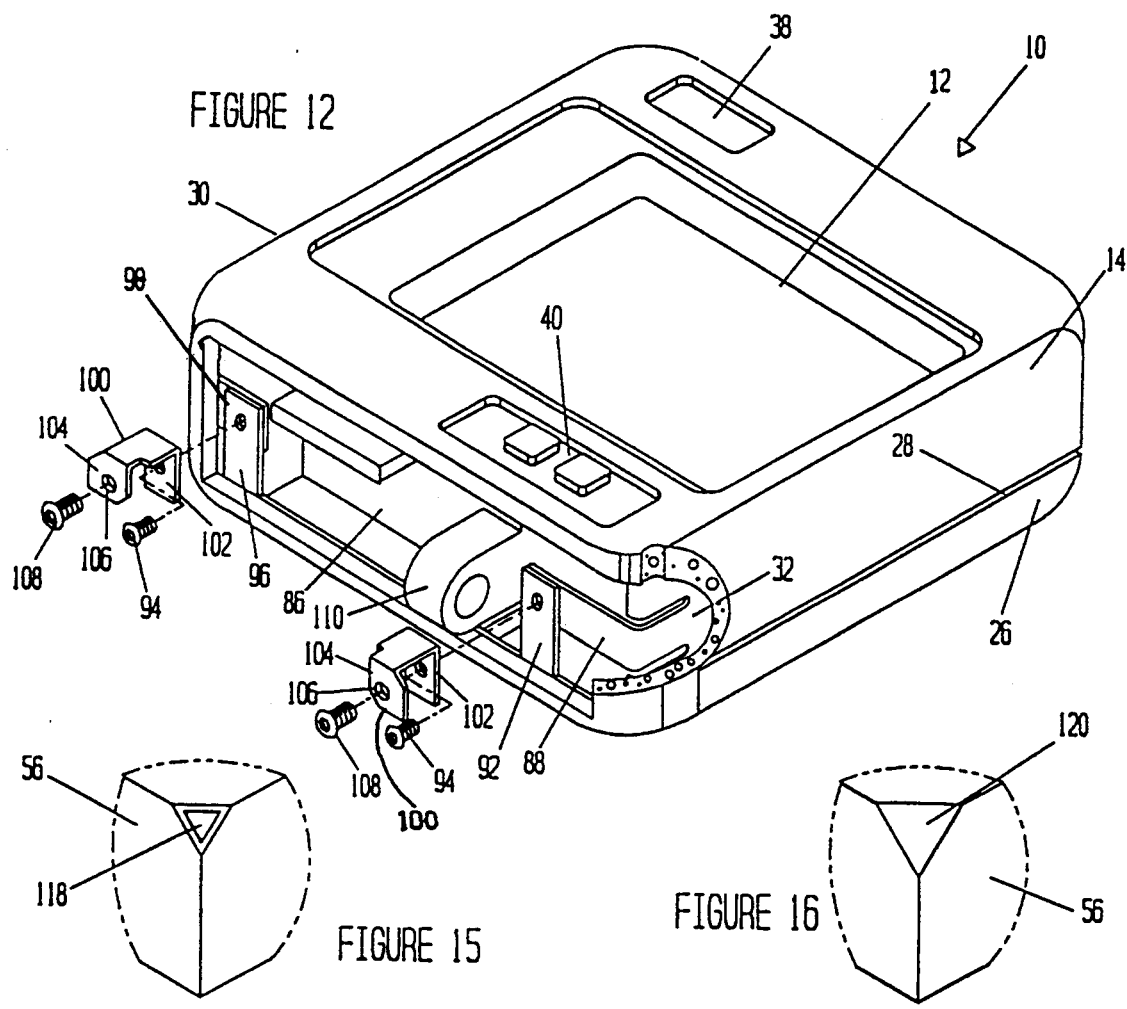

SOFT SHROUD FOR SCREEN DISPLAY DEVICE

BACKGROUND OF THE INVENTION

1. Field of Invention

This invention relates to a housing for the protection and support of a visual display panel and, in particular, for a housing useful for a thin screen display such as a liquid crystal display.

2. Brief Statement of the Prior Art

Liquid crystal displays and television monitors are typically housed within a hard plastic molded shroud or case. The plastic is formed by vacuum forming or by injection molding. Although these shrouds are acceptable for normal use, they are not acceptable for use in passenger aircraft as they cannot meet the FAA safety requirements for softness, to avoid injuries upon impact against the shroud. Although foamed plastics can be used to meet the FAA requirements, the usual foamed plastics have a substantial minimum thickness, typically 0.385 inch, necessary to form a smooth surface or skin which is free of porosity and voids. Further, flame retardant additives which are required in such an application increase the hardness of plastic foam, requiring additional thickness for adequate softness on impact.

Commonly, television displays in commercial passenger aircraft use projection screens at spaced locations in the passenger cabin. Recently, it has become desirable to provide individual television displays, using a liquid crystal display, located at each passenger's seat. The display must be sufficiently compact to permit it to be stowed in the seating. Passenger seats frequently have been provided with arm rests having storage compartments for trays and the like, and such an arrangement would be useful for stowing of liquid crystal displays, however, the internal dimensions of the arm rest compartments are too limited for storage of a liquid crystal display housing in a conventional plastic foam shroud.

Attempts which have been made to prevent injuries to passengers upon impact with the displays have employed "break away" support arms, or fabric covers for the displays. Neither of these attempts provides security against tampering or theft of the display. Also, the fabric covers do not provide a pleasing appearance and have limited impact absorbency.

OBJECTIVES OF THE INVENTION

It is an objective of this invention to provide a housing for a flat screen display such as a liquid crystal display.

It is also an objective of this invention to provide a housing which is useful to support a flat screen display in a car, boat, plane, etc.

It is a further object of this invention to provide a protective housing for a flat screen display which is surfaced with impact absorbing coatings.

It is a further object of this invention to provide a housing for a flat screen display which resists tampering and intrusion.

It is also an object of this invention to provide a method for manufacturing a housing for a flat screen display which has a soft, impact absorbing outer covering.

It is an ultimate objective of this invention to provide a housing for supporting and protecting a flat screen useful as a television display in commercial airliners.

BRIEF STATEMENT OF THE INVENTION

This invention comprises a housing for a thin, flat display screen such as a liquid crystal display. The housing is formed of components comprising a front housing section having a front panel with an opening for exposing the screen of a flat screen device placed within the housing and a rear cover therefor which includes a hinged attachment to the front housing section which is recessed and inaccessible from the exterior of the closed housing. The assembly of front housing section and rear cover is secured with tangs carried on the lower rear edges of these components. The housing is adapted to be mounted in the chair arm of a passenger seat of commercial airliners, and includes a mounting bracket permitting it to be stowed within the chair arm when not in use. In this application it is essential that the housing have an outer covering of impact absorbing material to protect passengers from injury upon impact against the housing. It is also important that the housing be tamper and intrusion proof. To this end, the housing components are formed with interior metal liners which are surfaced with plastic foam coatings that completely encase the assembled housing. A control panel with membrane control buttons is integrally formed with the outer foam covering.

BRIEF DESCRIPTION OF THE DRAWINGS

The invention will be described with reference to the figures of which:

FIG. 1 is a view of the top of the assembled housing of the invention;

FIG. 2 is a front view of the housing;

FIG. 3 is a rear view of the housing;

FIG. 4 is a view of the bottom of the housing with the bottom boot removed;

FIG. 5 is a side view of the housing;

FIG. 6 is an enlarged view of the area within arcuate line 6—6' of FIG. 3;

FIG. 7 is a perspective view of the front, top and side of the housing;

FIG. 8 is a view along line 8—8' of FIG. 3;

FIG. 9 is a sectional view of the bezel seated against a flat panel display;

FIG. 10 is a sectional view of the bezel in its relaxed configuration;

FIG. 11 is a sectional view through the integral control panel of the housing;

FIG. 12 is a perspective view of the assembly of the housing and mounting bracket of the invention;

FIG. 13 is a longitudinal sectional view of the boot and mounting attachment brackets of the invention;

FIG. 14 is a lateral sectional view of the boot of the housing;

FIG. 15 is a view of an outside corner of the metal liner of the housing; and

FIG. 16 is a view of the inside corner of the housing.

DESCRIPTION OF PREFERRED EMBODIMENTS

Referring now to FIGS. 1-7, the housing 10 of the invention is shown in assembly with a flat panel display device 12, such as a liquid crystal display within the housing. As there illustrated, the exterior shape of the housing 10 is generally thin rectangle. The housing has a front housing section 14 with an opening 16 in its front panel 18 for exposing the display panel 20 of the liquid crystal display device 12. The opening 16 is entirely surrounded by a bezel 22 which has an inner lip 24 that resiliently seals against the peripheral edges of the display panel.

The housing 10 is closed with a rear cover 26 and this closure is along the recessed seam line 28. The exterior top 30, sides 32, back 34 and front 18 of the assembled housing are devoid of any fasteners, hinges or other interlocking mechanisms. In this manner the security of the display device 12 within the housing 10 is insured, as the fasteners of the housing are not visible to the casual user.

The housing can have one or more recesses 36 and 38 which are useful for placement of indicia, printed instructions and the like. Additionally, the front panel 18 is provided with an integral control panel 40 that is formed as a plurality of membrane buttons 42 and 44 which are useful for controlling the contrast and/or intensity of the display. For this purpose, the buttons are provided marked with plus and minus indicia and are located in a surrounding recess 46.

The bottom of the housing 10 is covered by a boot section 48 which is formed as an elongated closed end trough that entirely surrounds the structural elements of the housing, such as the support bracket for the housing and display and the closure tangs for the housing, all described hereinafter.

All of the exterior edges and corners of the housing are rounded so that there are no sharp edges or corners which are presented to the user, thus minimizing the danger of injury from impact. Further, as described hereinafter, the housing is formed with an internal metal liner which provides the structural strength and integrity for the housing and is entirely covered with a thin layer of impact absorbing plastic foam, such as polyurethane foam.

The bezel 22 is tapered inwardly to provide a resilient lip 24 which seals against the front panel 20 of the display device 12. The device 12 is intended to be supported by a single pivotal arm, not shown, which is mounted on a chair arm of a passenger seat of a commercial airliner. The chair arm is hollow and has a hinged cover which closes its internal compartment in which the housing of this invention and display screen may be stowed when not in use.

The back panel 34 of the rear cover 26 is provided with a plurality of ventilation slots 50 which are molded into the outer thin foam covering and which provide air circulation for cooling of the display device. As shown in FIG. 6, a protective screen 52, which is formed of a perforated sheet, is secured to the inside rear metal liner 54 of the rear cover 26. Preferably, the perforations in the aluminum sheet are a constant and small diameter, e.g., 0.02 inch, to prevent insertion of objects through the ventilation slots 50.

Referring now to FIG. 8, the construction of the housing will be described in greater detail. As there illustrated, a cross-section is taken through the upper portion of the rear cover and the rear edge of the sidewall of the housing, along line 8—8' of FIG. 3. The housing section 14 is formed with a front panel 18 and an orthogonal top panel 30 and side panel 32. The rear cover 26 of the housing is generally planar, however, it too has an orthogonal top wall 31 and a side wall 33, which extend slightly beyond the back panel 34.

The entire housing is formed with internal metal liners, housing liner 56 for the housing section 14, and rear liner 54 for the rear cover. The metal liners are formed of sheet metal, typically aluminum having a thickness of about 0.029 inch. This material and its thickness is sufficient to provide the necessary strength and integrity of the housing.

The metal liners are completely covered with a thin layer 58 of plastic foam, preferably a polyurethane foam which is foamed in place against the exterior surfaces of the metal liners. The exterior surface 60 of the thin layer 58 of plastic foam is entirely coated with a very thin barrier coating 62 which masks the voids and porosity of the plastic foam. As described in greater detail with reference to FIGS. 15 and 16, the foam also forms fillets 120 at the interior corners of the housing 10.

FIG. 8 also illustrates the upper hinged attachment of the rear cover to the front housing section. The rear cover 26 has a retainer tab 64 which projects forwardly and downwardly from the inside edge 66 of the top wall 31 of the rear cover 26. The retainer tab 64 is formed entirely of an extension of the rear metal liner 54. The front housing section 14 also has a retainer tab 65 which projects rearwardly and downwardly from the inside edge of the front liner 56, adjacent to and coextensive with tab 64. A slotted retainer bracket 68 is inserted against the inside top wall of the front liner. The forward edge of the bracket (not shown) seats against the inside vertical wall of the front liner, and in this location, positions its slot 69 into alignment with the tabs 64 and 65, which are received within the slot 69. The slot 69 and tabs preferably extend for a substantial distance of the width of the housing 10, thus forming a continuous interlocking hinge along the upper or top panel 30 of the housing 10.

The thin layer 58 of plastic foam coating on the exterior of the metal liners is preferably recessed with a groove 70 which is coextensive with the peripheral edge of the housing section 14 of the housing 10. This recesses the seam line 28 between the front housing section 14 and rear cover 26, minimizing and obscuring any irregularities of this seam. Also, the mating edges 74 and 76 of the thin layers 58 on each of the housing section 14 and rear cover 26 extend slightly beyond the edges of the metal liners 54 and 56, thereby compressing together in the final assembly for a firm seal.

Referring now to FIGS. 9 and 10, there are illustrated sectional views through the bezel 22 on the front panel of the housing. The bezel 22 is formed integral with the thin foam coating, and is covered with the barrier coating 62. The bezel has a tapered cross section, forming an inwardly deflected lip 24 which contacts the front panel 20 of the display device, and is deflected thereby when the assembly is completed. When the plastic foam coating 58 is formed, it does not incorporate open cells in very thin sections, so the bezel 22 can be formed with a lip 24 of unfoamed plastic which is quite strong and is sufficiently resilient to deflect and seal about the display device, insuring that the bezel lip 24 seals tightly against the display panel 20. FIG. 10 illustrates bezel 22 with its lip 24 in a relaxed configuration, while FIG. 9 illustrates the lip seal when deflected under loading by placing the display device within the container and closing the container. In this way, the lip provides a very resilient seal entirely about the periphery of the screen of the display device, thus preventing dust or liquids from entering the internals of the container.

Referring now to FIG. 11, there is shown a sectional view along lines 11—11' of FIG. 2, illustrating the control panel 40 of the housing 10. The control panel 40 is formed in a recess 46 molded into the exterior thin layer 58 of plastic foam which covers the housing section 14.

The front panel 18 of the housing section has an elongated slot 78 corresponding to the length and width of the control panel 40 and the thickness of the thin layer 58 of plastic foam coating is reduced to form the control panel recess as an unfoamed thin membrane 46 of plastic which has sufficient strength and resiliency to function as a membrane switch. The control buttons 42 and 44 are also formed of the plastic foam and each is formed with an integral, rearwardly extending post 80. The posts 80 receive surrounding rigid sleeves 82, of plastic or metal, and the length of the posts 80 and sleeves 82 is sufficient to extend inwardly and bear against the control buttons or switches 84 which are provided on the display device 12, shown in phantom lines. The rigid sleeves 82 transmit the pulsing of the switches of the display unit 12, and impart a tactile feel to the membrane switches 42 and 44. The integral membrane 46 and buttons 42 and 44 avoid any discontinuity of the coating about the control panel 40. This also prevents tampering or intrusion of dust or liquids into the housing 10.

Referring now to FIG. 12, the housing 10 of the invention is shown in a prospective view which illustrates its undersurface, with boot section 48 removed. The undersurface of the housing 10 has an opening 90 to provide access for mounting and servicing of the installation. As there illustrated, the assembly includes a mounting bracket 86 which is attached to the display device 12. As shown in the cutout portion of the thin layer 58 of plastic foam coating, the sidewall of the front housing section includes tang 88 which extends into the bottom opening 92. Tang 98 extends orthogonally to the side wall 32, and a mating rear tang 92 which extends from the rear cover 26 overlaps the side tang 98. Apertures are provided in each of the tangs 88 and 90 which align upon closure of the housing, and these apertures receive an assembly screw 94 which threads into a floating nut plate (not shown) carried on the liquid display device 12 within the housing 10. On the opposite side, a similar rear tang 96 is provided on the rear cover section which cooperates with a mating side tang 98 that extends orthogonally from the opposite side wall 30.

Each of the assembly screws 94 also extends through a mounting bracket 100. Each of the mounting brackets 100 is generally U-shaped with a first wing 102 that receives the assembly screw and an opposite wing 104 that has a threaded aperture 106 to receive the assembly screw 108 which secure the boot section 48 to the housing 10.

Referring now to FIG. 13, there shown a sectional view through the boot section 48 of the invention. The drawing scale prevents sectioning of the barrier coating, the plastic coating and metal shell. The boot section 48 is a closed end trough having apertures 107 at opposite ends to receiving flat-headed screws 108 which extend through the boot section 48 and into the threaded apertures 106 of the boot mounting brackets 100. The seat mounting bracket 86 which is permanently secured to the underside of the liquid crystal display device 12 extends substantially the entire distance between the boot mounting brackets 100 and has an apertured lug 110 to receive the support shaft of the mounting arm (not shown). The electrical cable 111 which supplies power and image to the liquid crystal display also enters through the bottom wall 112 of the boot section 48 and plugs into a connector receptacle on the bottom edge of the liquid crystal display device.

Referring now to FIG. 14, there is shown a sectional view through the boot section 48. As there illustrated, the boot has an internal, metal boot liner 114 which provides the structural integrity to the boot section 48, and which is entirely covered with the thin layer 59 of plastic foam. The foam is entirely covered with an outer barrier layer 116 to provide a surface free of imperfections or voids.

A feature of the housing is an increased thickness of plastic foam at the corners of the housing. This is achieved by chamfering the corners of the metal liners for the front and cover of the housing. FIG. 15 illustrates a chamfered exterior corner of the liner 56 for the front cover, which provides a triangular corner aperture 118 through which the plastic foam will extrude during molding of the housing. The extruded foam forms a corner fillet 120 inside the housing, as shown in FIG. 16. The resultant corner thus has an increased thickness and a greater resiliency than the flat areas of the housing.

The invention has been described with reference to the illustrated and presently preferred embodiment. It is not intended that the invention be unduly limited by this disclosure of the presently preferred embodiment. Instead, it is intended that the invention be defined, by the means, and their obvious equivalents, set forth in the following claims:

What is claimed is:

1. In a housing for a visual display device having a front face with a display screen, which housing includes a front housing section with a front wall, opposite side walls and top and bottom walls, with said front wall having a bezel surrounding said screen display, the improvement comprising:
   a. an interior metal housing with opposite side walls and top and bottom walls receiving said visual display device and having a front panel with an opening in said front panel surrounding said display screen and a rear cover with a rear wall to enclose said visual display device, and an opening in the bottom wall of said housing;
   b. a plastic foam thin layer having a thickness from 0.1 to 0.375 inch entirely covering said interior metal housing and rear cover;
   c. an impervious plastic coating overlying said thin layer;
   d. supporting mounting brackets received in said opening in said bottom wall of said housing.

2. The housing for a visual display device of claim 1 including a bezel surrounding said opening and formed integral with said plastic foam layer.

3. The housing for a visual display device of claim 2 wherein said bezel has a tapered cross section with a thin walled lip which is resilient to deflect and seal against said visual display device.

4. The housing for a visual display device of claim 3 wherein said lip of said bezel is peripherally disposed about said opening and resiliently deflects and seals about said display screen.

5. The housing for a visual display device of claim 1 wherein said visual display device includes a control panel having at least one control key on its forward face and including a second opening in said interior housing surrounding said display control panel, and including a flexible membrane of unfoamed plastic overlying said second opening.

6. The housing for a visual display device of claim 5 wherein said plastic membrane is one-piece with said plastic foam thin layer, of the same plastic as said thin layer.

7. The combination of the housing for a visual display device of claim 1 and a visual display device received within said housing.

8. The housing for a visual display device having a front face with a display screen and at least one control key, which housing includes:
   a. a front housing section having a bezel surrounding said screen display and formed with
      1. an interior metal housing receiving said visual display device and having a front panel with an opening surrounding said display screen;
      2. a plastic foam thin layer having a thickness from 0.1 to 0.357 inch entirely covering said interior metal housing; and
      3. an impervious coating overlaying said thin layer;
   b. a control panel formed by a second opening in said interior metal housing surrounding said control panel, and a flexible membrane one-piece with said plastic foam thin layer and formed of the same plastic as said thin layer extending over second opening;
   c. at least one button formed as one piece with said plastic membrane and of a thickness greater than said membrane to provide a button surface raised above the surface of said plastic membrane and located opposite said display device control key.

9. The housing for a visual display device of claim 8 including a post formed as one piece with and extending from the rear surface of said button into bearing contact with said display device control key of said visual display device.

10. The housing for a visual display device of claim 9 including a rigid sleeve received over said post.

11. The housing for a visual display device having a front face with a display screen, which housing includes:
   a. a front housing section having a bezel surrounding said screen display and formed with
      1. an interior metal housing receiving said visual display device and having a front panel with an opening surrounding said display screen, said formed with chamfered corners to provide a triangular aperture at each internal corner thereof;
      2. a plastic foam thin layer foamed in place about said metal housing and having a thickness from 0.1 to 0.357 inch entirely covering said interior metal housing; with said plastic foam extruded into said triangular apertures to form a plastic foam fillet in each of the interior corners of said housing; and
      3. an impervious coating overlying said thin layer.

12. In a secured housing for a visual display device having a screen display, which housing includes a front panel having an opening surrounding said screen display, the improvement comprising:
   d. a front housing section formed by said front panel and peripheral, orthogonal top and opposite side walls and having a rearwardly extending first tang dependent from said top wall and substantially coextensive therewith;
   e. a rear housing cover comprising a rear panel having a top edge and a bottom edge and having a forwardly extending tang dependent from and substantially extensive with said top edge;
   f. a retainer bracket positioned along said top wall of said front housing section and having a slot therein which receives said first and second tangs to form a detachable hinged attachment of said rear housing cover and said front housing section;
   g. attachment means on the bottom wall of said front housing section and cooperating attachment means adjacent the bottom edge of said rear housing cover for securing said rear housing cover in a closed position against said front housing section.

13. The housing for a visual display device of claim 12 wherein said attachment means on said front housing section comprises at least one front housing section bottom tang projecting along the bottom of said housing section from one of said side walls.

14. The secured housing for a visual display device having a screen display of claim 13 wherein said cooperative attachment means includes at least one rear housing cover bottom tang projecting from the bottom edge of said rear housing cover and extending forwardly therefrom to a position adjacent said front housing bottom tang.

15. The secured housing for a visual display device having a screen display of claim 14 wherein each of said front housing section bottom tang and said rear housing cover bottom tang has an aperture, and said apertures are aligned when said rear housing cover is closed over said front housing section.

16. The secured housing for a visual display device having a screen display of claim 15 including a pair of front housing section bottom tangs and a pair of rear housing cover bottom tangs, one each located at opposite sides of said housing.

17. The combination of housing and visual display device having a front face with a display screen, which housing includes:
   a. a front housing section having a bezel surrounding said screen display and formed with
      1. an interior metal housing receiving said visual display device and having a front panel with an opening surrounding said display screen;
      2. a plastic foam thin layer foamed in place about said metal housing an having a thickness from 0.1 to 0.375 inch entirely covering said interior metal housing; and
      a mounting bracket secured to the undersurface of said display device with a mounting lug projecting from the underside of said bracket and extending outwardly from the underside of said housing.

18. The housing and visual display device of claim 17 including a bottom boot having a trough shape and secured to the bottom of said housing.

19. The housing and visual display device of claim 18 wherein said boot surround said front housing section bottom tangs and rear housing cover bottom tangs.

20. The housing and visual display device of claim 19 wherein said boot is formed of an interior metal liner covered with a plastic foam thin boot layer and an impervious plastic coating overlying said foam thin boot layer.

* * * * *